United States Patent
Chang et al.

(10) Patent No.: US 12,491,928 B2
(45) Date of Patent: Dec. 9, 2025

(54) INDEPENDENT CORNER MODULE

(71) Applicants: Hyundai Motor Company, Seoul (KR); Kia Corporation, Seoul (KR)

(72) Inventors: Sehyun Chang, Suwon-Si (KR); Sang Woo Hwang, Seoul (KR); Min Jun Kim, Busan (KR); Young Il Sohn, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 631 days.

(21) Appl. No.: 17/964,810

(22) Filed: Oct. 12, 2022

(65) Prior Publication Data
US 2023/0051754 A1 Feb. 16, 2023

(30) Foreign Application Priority Data
Dec. 8, 2021 (KR) ........................ 10-2021-0174293

(51) Int. Cl.
*B62D 5/00* (2006.01)
*B62D 5/04* (2006.01)

(52) U.S. Cl.
CPC ........... *B62D 5/001* (2013.01); *B62D 5/0418* (2013.01)

(58) Field of Classification Search
CPC ........ B62D 3/02; B62D 5/001; B62D 5/0418; B62D 7/18; B62D 7/20; B62D 7/06; B60G 2204/30; B60G 2206/011
See application file for complete search history.

(56) References Cited

U.S. PATENT DOCUMENTS

| | | | | |
|---|---|---|---|---|
| 5,577,758 A | * | 11/1996 | Csik | B60G 7/008 280/124.134 |
| 6,336,514 B1 | * | 1/2002 | Ramacher | B62D 7/02 180/443 |
| 2005/0280236 A1 | * | 12/2005 | Vallejos | B60G 3/01 280/124.11 |

(Continued)

FOREIGN PATENT DOCUMENTS

| | | | | |
|---|---|---|---|---|
| CN | 108516013 A | * | 9/2018 | ........... B62D 5/0421 |
| KR | 2007-0103191 A | | 10/2007 | |
| WO | WO-2020145166 A1 | * | 7/2020 | ............... B60G 3/20 |

OTHER PUBLICATIONS

Zhang et al., Independent steering device for rail-mounted four-wheel-drive electric automobile, Sep. 11, 2018, EPO, CN 108516013 A, Machine Translation of Description (Year: 2018).*

*Primary Examiner* — James A English
(74) *Attorney, Agent, or Firm* — Morgan Lewis & Bockius LLP

(57) ABSTRACT

An independent corner module includes an axle fastened to and positioned on a wheel, a steering frame fastened to the axle and rotated integrally with the axle to apply a steering angle to the wheel, a vehicle body guide rail positioned on a vehicle body and fastened to a rotation center axis of the steering frame, a steering driving portion positioned between the steering frame and the vehicle body guide rail to apply a driving force, and a leaf spring unit positioned between the axle and the steering frame, in which the steering driving portion is rotated along the vehicle body guide rail in response to the driving force of the steering driving portion, and at a same time, the steering frame is configured to be rated around the steering driving portion.

15 Claims, 8 Drawing Sheets

(56) References Cited

U.S. PATENT DOCUMENTS

2008/0100021 A1\* 5/2008 Yamada ................ B60G 3/01
 280/124.164
2013/0333966 A1\* 12/2013 Bryant ................ B60K 17/30
 180/65.51

\* cited by examiner

[FIG. 1]
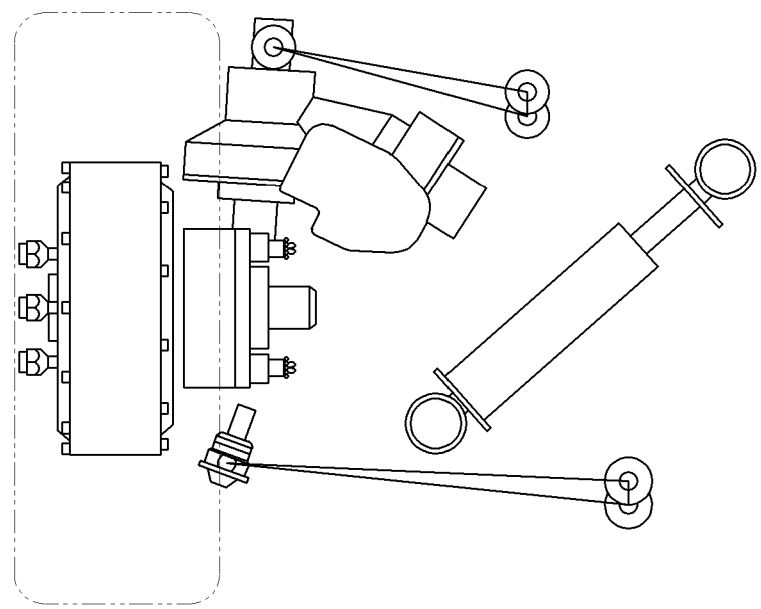
[FIG. 2a]
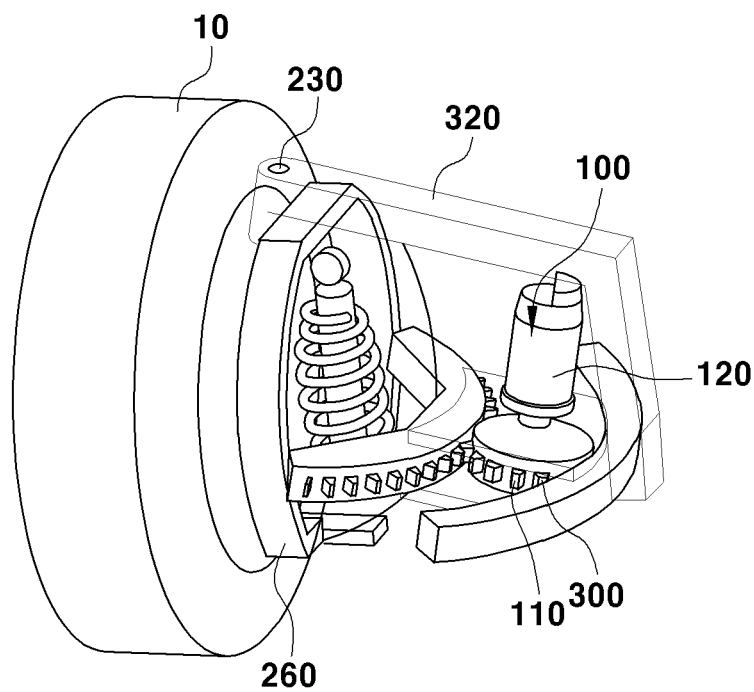

[FIG. 2b]
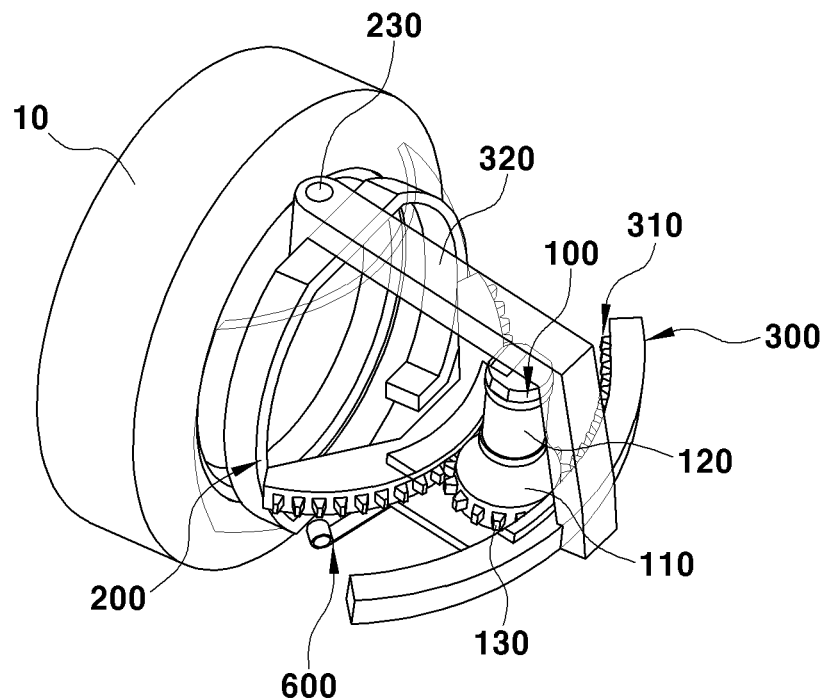
[FIG. 3a]
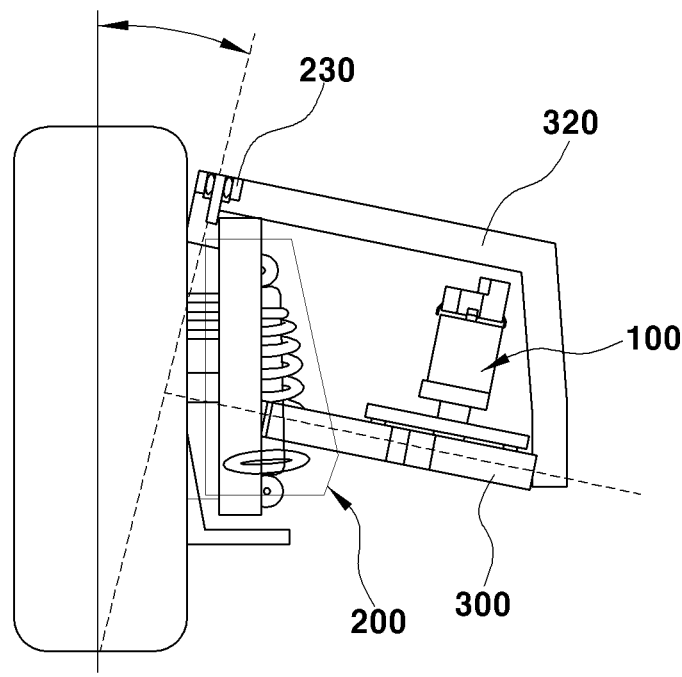

[FIG. 3b]
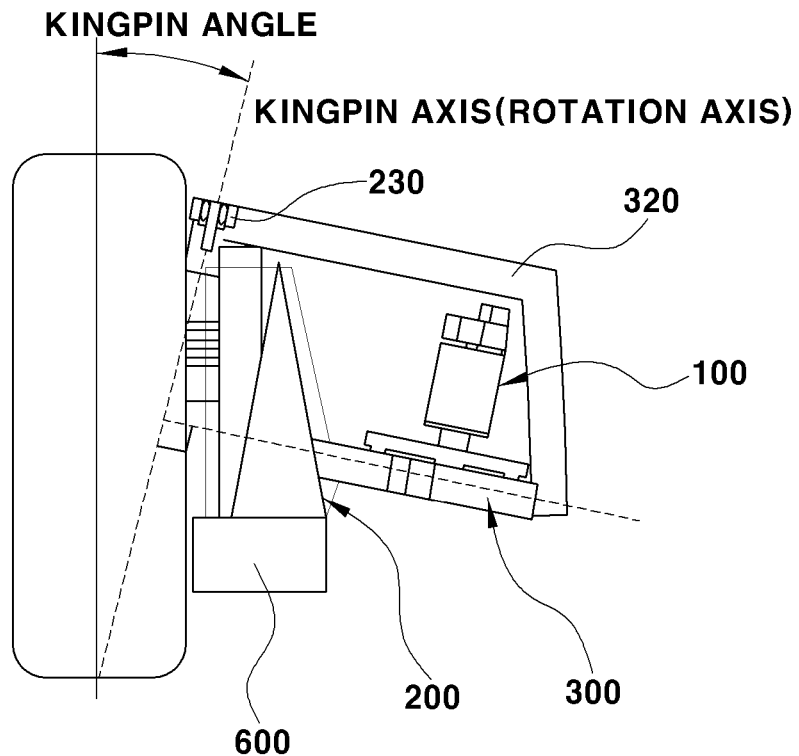
[FIG. 4a]
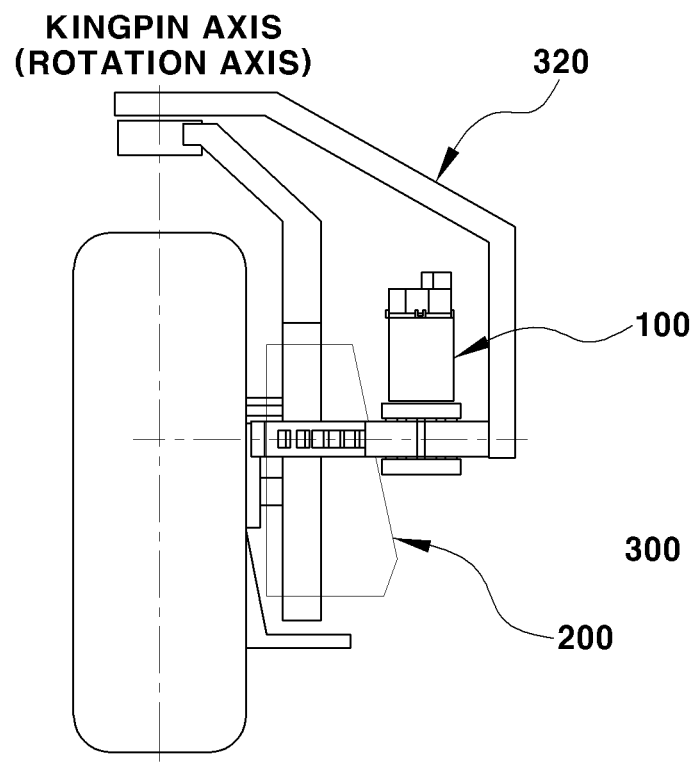

[FIG. 4b]
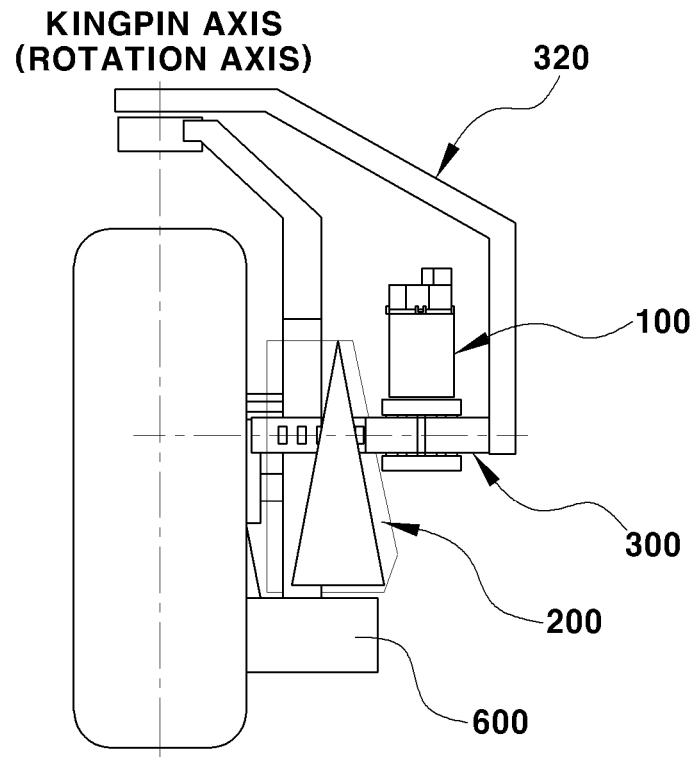
[FIG. 5]
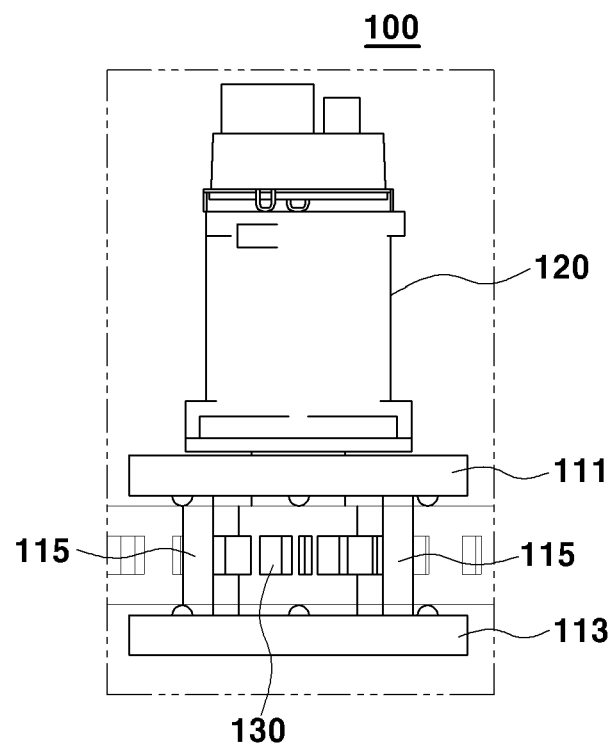

[FIG. 6]
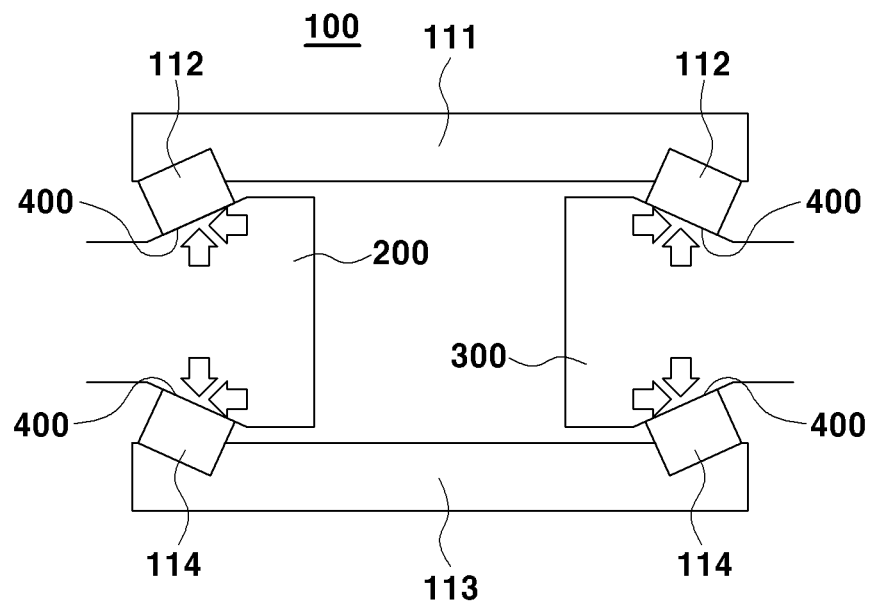
[FIG. 7a]
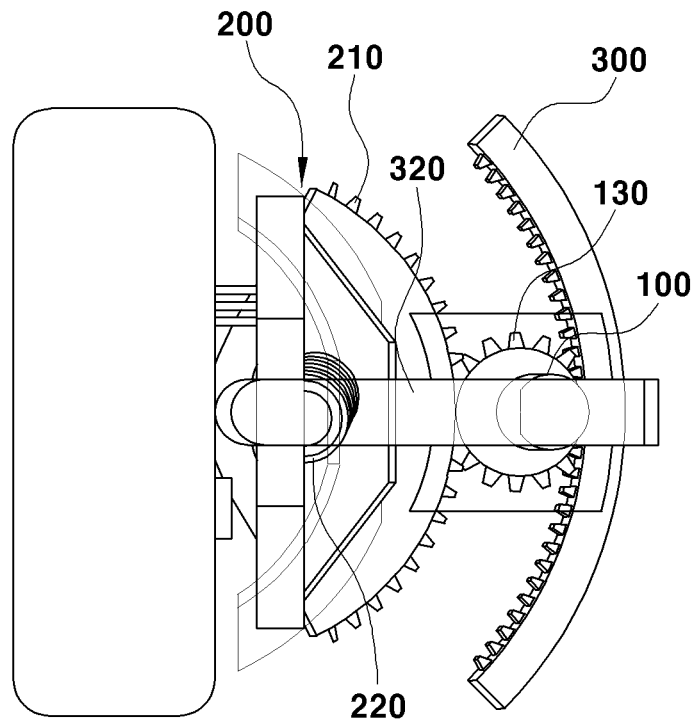

[FIG. 7b]
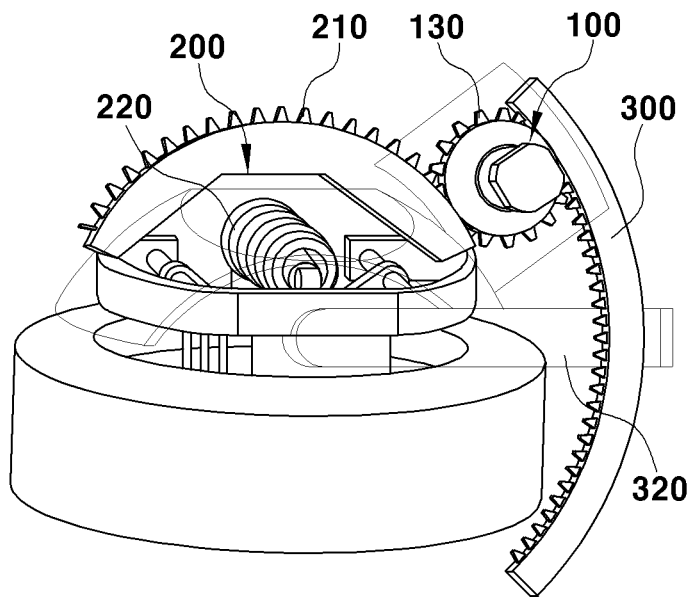
[FIG. 7c]
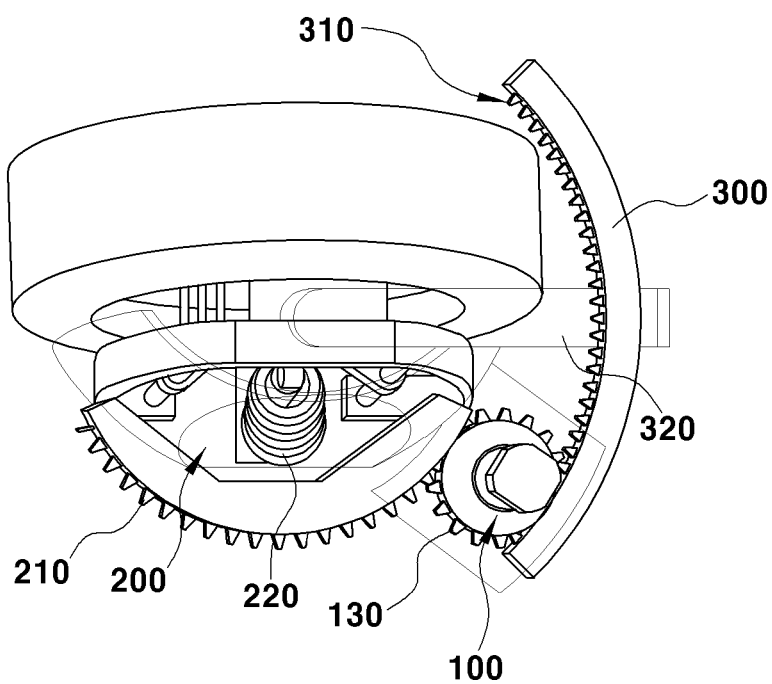

[FIG. 8a]
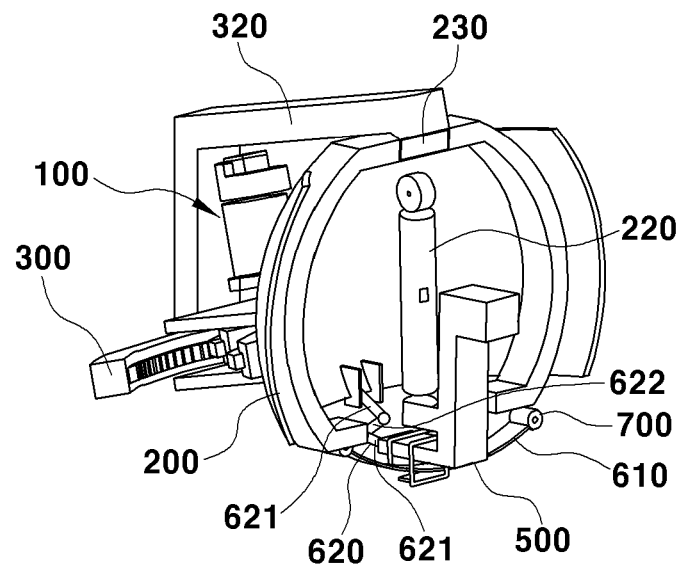
[FIG. 8b]
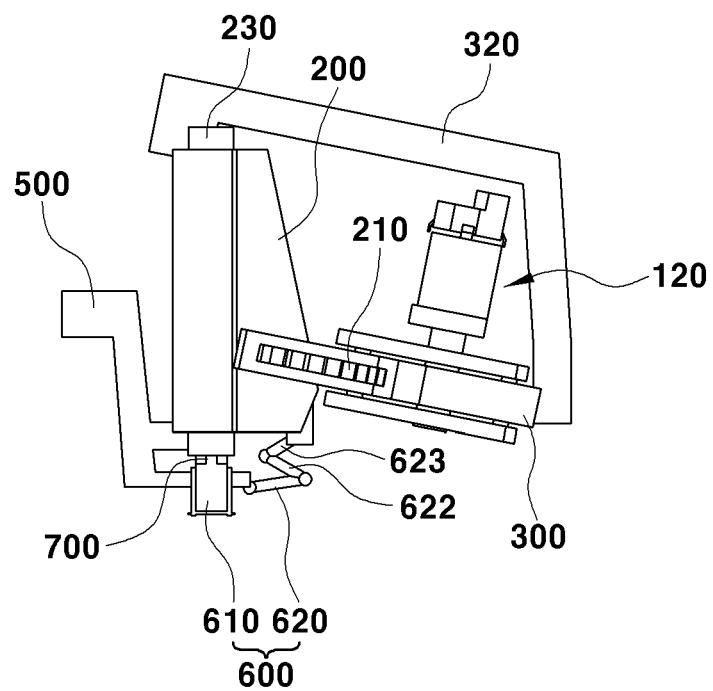

[FIG. 9]
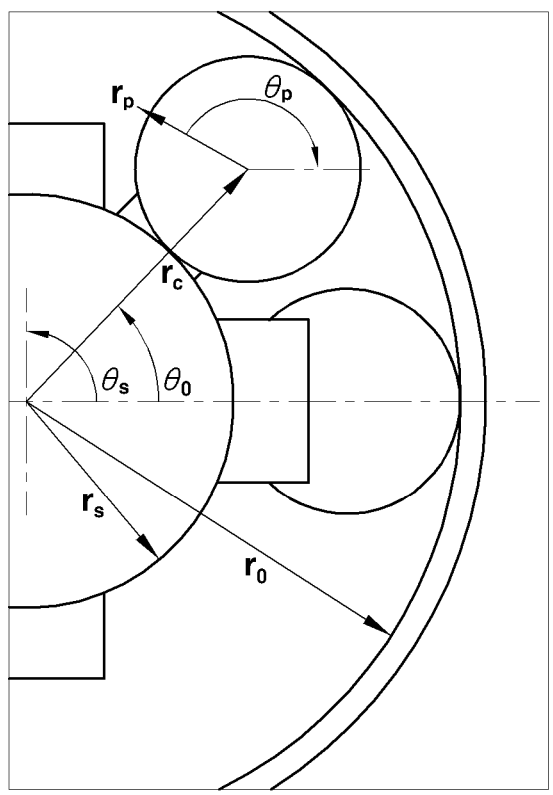

INDEPENDENT CORNER MODULE

CROSS-REFERENCE TO RELATED APPLICATION

The present application claims priority to Korean Patent Application No. 10-2021-0174293 filed on Dec. 8, 2021, the entire contents of which is incorporated herein for all purposes by this reference.

BACKGROUND OF THE PRESENT DISCLOSURE

Field of the Present Disclosure

The present disclosure relates to an independent corner module, and more preferably, to an independent corner module configured so that a steering driving portion and a steering frame are independently rotated in response to a driving force of the steering driving portion positioned between the steering frame and a vehicle body guide rail to apply a wide steering angle to a wheel.

Description of Related art

A conventional suspension device of a vehicle connects an axle to a vehicle body so that vibration or shock received by the axle from the road surface is not directly delivered to the vehicle body while the vehicle is traveling, preventing damage to the vehicle body or the cargo and improving riding comfort. This suspension device is provided with a suspension spring alleviating the shock received from the road surface, a shock absorber improving riding comfort by suppressing free vibration of the suspension spring, and a stabilizer suppressing rolling of the vehicle.

The suspension device of the commercial vehicle mainly utilizes an integral axle type suspension in which the left and right wheels are connected by one axle, and a leaf spring or an air spring is mainly used as the suspension spring.

Meanwhile, the steering system of the commercial vehicle using the integral axle type suspension device is composed of a pitman arm mounted on an output axis of a steering gear to rotate, a drag link that delivers the motion of the present pitman arm to an axle arm, an axle arm that receives the motion of the drag link to operate an axle spindle, and a tie rod that connects the left and right axle arms.

FIG. 1 shows a suspension system in which one end portion of the shock absorber is fixed to a vehicle body frame.

In a vehicle provided with the integral axle type suspension device and the steering device using the air spring as described above, the air spring only serves to replace the leaf spring and does not significantly contribute to improving riding comfort and handling characteristics, and it is difficult to secure the degree of freedom in design due to its structural characteristics in implementing the precise geometry.

Furthermore, an independent steering type suspension device that performs a steering angle input of the wheel through a motor assembly to each suspension device is recently being developed. However, for the aforementioned independent steering type suspension device, there is a problem in stably delivering the rotation force applied from a steering motor to the axle and the wheel.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an independent corner module that provides independent rotations of a steering driving portion and a steering frame.

Furthermore, another object of the present disclosure is to rotate a steering driving portion in response to a single driving force of the steering driving portion and to provide a steering frame rotatable simultaneously with the steering driving portion with respect to the rotated steering driving portion.

Furthermore, yet another object of the present disclosure is to provide an independent corner module configured for easily absorbing the shock applied to an axle through a leaf spring unit positioned on a lower end portion of a steering frame.

The objects of the present disclosure are not limited to the aforementioned objects, and other objects of the present disclosure not mentioned may be understood by the following description, and may be more clearly seen by an exemplary embodiment of the present disclosure. Furthermore, the objects of the present disclosure may be achieved by means described in the claims and a combination thereof.

An independent corner module for achieving the objects of the present disclosure includes the following configuration.

An exemplary embodiment of the present disclosure provides an independent corner module including: an axle fastened to and positioned on a wheel; a steering frame fastened to the axle and rotated integrally with the axle to apply a steering angle to the wheel; a vehicle body guide rail positioned on a vehicle body and fastened to a rotation center axis of the steering frame; a steering driving portion positioned between the steering frame and the vehicle body guide rail to apply a driving force; and a leaf spring unit positioned between the axle and the steering frame, in which the steering driving portion is rotated along the vehicle body guide rail in response to the driving force of the steering driving portion, and at a same time, the steering frame is configured to be rotated around the steering driving portion.

Furthermore, the steering driving portion includes a carrier link surrounding at least a portion of the steering frame and the vehicle body guide rail and moving along the vehicle body guide rail; a motor configured to apply a rotation force; and a steering gear portion configured to extend from a rotation axis of the motor and fastened to the vehicle body guide rail and the steering frame.

Furthermore, the carrier link further includes an upper plate positioned on upper end portions of the steering frame and the vehicle body guide rail; a lower plate surrounding lower end portions of the steering frame and the vehicle body guide rail at a position corresponding to the upper plate; an upper roller portion positioned between the steering frame and the upper plate and between the vehicle body guide rail and the upper plate; and a lower roller portion positioned between the steering frame and the lower plate and between the vehicle body guide rail and the lower plate.

Furthermore, the upper roller portion and the lower roller portion are aligned to face inclined portions formed on one end portions of the steering frame and the vehicle body guide rail.

Furthermore, the steering frame further includes a buffering portion positioned between the steering frame and the axle; and a gear portion formed at a position facing the steering driving portion.

Furthermore, the vehicle body guide rail further includes a guide gear portion formed at a position facing the steering driving portion; a bearing portion configured at a position facing an upper end portion of the steering frame; and an up and down connection frame fixing the bearing portion.

Furthermore, the up and down connection frame is configured so that a height thereof is increased toward an outside surface of the vehicle body.

Furthermore, the gear portion of the steering frame and the guide gear portion of the vehicle body guide rail have a same rotation axis.

Furthermore, the leaf spring unit further includes a leaf spring portion positioned on the axle and the lower end portion of the steering frame; and a side link portion positioned on the leaf spring portion and in the width direction of an internal surface of the steering frame.

Furthermore, one end portion of first and second end portions of the leaf spring portion fastened to the steering frame is fastened through a shackle.

Furthermore, the side link portion includes a first side link extending in the side direction of the axle fastened to the leaf spring portion; a second side link fastened to an edge portion of the first side link; and a third side link positioned between an edge portion of the second side link and the inside of the steering frame.

Furthermore, the steering driving portion is configured to be moved upwards to both end portions of the vehicle body guide rail in response to the driving force of the steering driving portion.

Furthermore, the steering driving portion is configured to be positioned on both end portions of the steering frame if the steering driving portion is positioned on both end portions of the vehicle body guide rail.

The present disclosure may obtain the following effects by the aforementioned exemplary embodiment of the present disclosure, and the configuration, coupling, and use relationship, which will be described below.

According to an exemplary embodiment of the present disclosure, the steering driving portion and the steering frame are independently rotated to provide the wider steering angle applied to the wheel.

Furthermore, the present disclosure includes the leaf spring unit positioned between the steering frame and the axle to provide the structural stability configured for absorbing the behaviors in the height direction and the longitudinal direction in response to the shock applied to the wheel.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels determined from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 shows the coupling relationship of an revo axle as the related art.

FIG. 2A shows a perspective view of an independent corner module as an exemplary embodiment of the present disclosure.

FIG. 2B shows a perspective view of the independent corner module including a leaf spring unit as the exemplary embodiment of the present disclosure.

FIG. 3A shows a front view of the independent corner module forming a kingpin axis according to the exemplary embodiment of the present disclosure.

FIG. 3B shows a front view of the independent corner module including the leaf spring unit forming the kingpin axis as the exemplary embodiment of the present disclosure.

FIG. 4A shows a front view of an independent corner module forming a kingpin axis as another exemplary embodiment of the present disclosure.

FIG. 4B shows a front view of the independent corner module including the leaf spring unit forming the kingpin axis as another exemplary embodiment of the present disclosure.

FIG. 5 shows the coupling relationship of a steering driving portion of the independent corner module according to the exemplary embodiment of the present disclosure.

FIG. 6 shows the coupling relationship of a roller portion of the independent corner module according to the exemplary embodiment of the present disclosure.

FIG. 7A shows a top view of a state where a steering angle of the independent corner module is 0 degree as the exemplary embodiment of the present disclosure.

FIG. 7B shows a top view of a state where the steering angle of the independent corner module is 90 degrees to the left as the exemplary embodiment of the present disclosure.

FIG. 7C shows a top view of a state where the steering angle of the independent corner module is 90 degrees to the right as the exemplary embodiment of the present disclosure.

FIG. 8A shows a configuration view of the leaf spring unit of the independent corner module as the exemplary embodiment of the present disclosure.

FIG. 8B shows a front view of the configuration relationship of the leaf spring unit of the independent corner module as the exemplary embodiment of the present disclosure.

FIG. 9 shows the driving relationship for determining the steering angle of the independent corner module as the exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment of the present disclosure will be described in more detail with reference to the accompanying drawings. Exemplary embodiments of the present disclosure may be modified in various forms, and the scope of the present disclosure should not be construed as being limited to the following exemplary embodiments of the present disclosure. The exemplary embodiment of the present disclosure is provided to more completely explain the present disclosure to those skilled in the art.

Furthermore, terms such as " . . . axle", " . . . part", " . . . rail", " . . . frame", " . . . link", etc. described in the specification refer to units of processing at least one function or operation, which may be implemented by hardware or a combination of hardware.

Hereinafter, the exemplary embodiments will be described in detail with reference to the accompanying drawings, and in describing the present disclosure with reference to the accompanying drawings, the same reference numerals are denoted by the same or corresponding components, and the overlapping description thereof will be omitted.

The present disclosure relates to an independent corner module, and a multi-wheeled vehicle may include each independent corner module fastened to a vehicle body, and the independent corner module may have a steering angle of 90 degrees in the left and right directions.

The independent corner module may be fixed to the vehicle body, and fastened to the vehicle body through welding or bolting coupling, and may be electrically conducted with a battery positioned on the vehicle body so that power may be applied from the vehicle body. As described above, the independent corner module may be configured to be electrically conducted with the vehicle while being fixed to the vehicle body according to the general method.

Hereinafter, a configuration of the independent corner module according to an exemplary embodiment of the present disclosure including a wheel 10 positioned on the left of the vehicle will be described.

FIG. 2A shows a perspective view of an independent corner module according to an exemplary embodiment of the present disclosure, and FIG. 2B shows a perspective view of the independent corner module including a leaf spring unit. Furthermore, FIG. 3A shows a front view of the independent corner module, FIG. 3B shows a front view of the independent corner module including the leaf spring unit, FIG. 4A shows a front view of an independent corner module, and FIG. 4B shows a front view of the independent corner module according to another exemplary embodiment including the leaf spring unit.

As shown, each of the independent corner modules according to an exemplary embodiment of the present disclosure includes a vehicle body guide rail 300 fastened to the vehicle body, a steering driving portion 100 positioned adjacent to an external surface of the vehicle body guide rail 300, and a steering frame 200 positioned outside the steering driving portion 100. An upper end portion of the steering frame 200 is fixed to the vehicle body through the vehicle body guide rail 300 to be rotatable in response to the input of a steering angle of the wheel 10.

The independent corner module includes an axle 500 positioned adjacent to the steering frame 200, and includes the wheel 10 outside the axle 500. The axle 500 is positioned adjacent to a lower end portion of the steering frame 200 and the steering frame 200 is configured to be rotated in the left and right directions integrally with the axle 500 around the upper end portion of the steering frame 200 fastened to the vehicle body. The upper end portion of the steering frame 200 may be configured to be fixed to the vehicle body through an up and down connection frame 320 of the vehicle body guide rail 300. As shown in FIG. 2A, the independent corner module may include a buffering portion 220 between the steering frame 200 and the axle 500.

The steering frame 200 includes a partition wall configured to surround an internal end portion of the axle 500 and including a gear portion 210 protruding to the outside of the partition wall to have an arc shape. The upper end portion of the partition wall of the steering frame 200 is fastened to the vehicle body guide rail 300 so that the steering frame 200 is rotated around one end portion fastened to the vehicle body guide rail 300. Furthermore, the respective facing surfaces of the steering frame 200 and the vehicle body guide rail 300 facing adjacent to each other may have the same central arc shape.

Furthermore, the steering driving portion 100 is configured to move up to both end portions of the vehicle body guide rail 300 in response to a driving force of the steering driving portion 100, and configured so that the steering driving portion 100 is positioned on both end portions of the steering frame 200 if the steering driving portion 100 is positioned on both end portions of the vehicle body guide rail 300.

Furthermore, the independent corner module includes the vehicle body guide rail 300 to maintain a predetermined interval from an external end portion of the steering frame 200 with respect to the steering driving portion 100. Furthermore, one end portion of the vehicle body guide rail 300 has an arc shape to correspond to one end portion of the steering frame 200 including the arc shape. One end portions of the steering frame 200 and the vehicle body guide rail 300 including the arc shape may be configured so that a central axis of the steering frame 300 is positioned at a rotation center axis of the steering frame 200. Furthermore, the one end portion of the steering frame 200 including the arc shape and the one end portion of the vehicle body guide rail 300 have the same interval from each other, and the steering driving portion 100 is configured to be positioned between the one end portion of the steering frame 200 including the arc shape and the one end portion of the vehicle body guide rail 300 to apply a rotation force to the steering frame 200 and the vehicle body guide rail 300. Furthermore, the buffering portion 220 is positioned inside the axle 500 and the steering frame 200 to absorb the shock applied to the wheel. The buffering portion 220 may have a lower end portion fastened to the axle 500 and an upper end portion fixed to the steering frame 200 or to the vehicle body through the steering frame 200.

FIGS. 2B, 3B, and 4B show that the axle 500 is positioned adjacent to the lower end portion of the steering frame 200, and the independent corner module includes a leaf spring unit 600 positioned between the axle 500 and the steering frame 200. The leaf spring unit 600 includes a leaf spring portion 610 including both end portions fastened to the steering frame 200 and a side link portion 620 extending from the axle 500 to which the leaf spring portion 610 is fastened to the side and fastened to an internal surface of the steering frame 200.

The leaf spring portion 610 has both end portions fastened to the lower end portion of the steering frame 200 and to control the vertical movement applied to the wheel at the same time as the buffering portion 220 fastened to the axle 500. Furthermore, the leaf spring portion 610 may be configured to simultaneously perform the longitudinal movement as well as the vertical movement of the wheel, distributing the load applied to the wheel in the vertical and longitudinal directions.

According to the exemplary embodiment of the present disclosure, the side link portion 620 includes three links fastened to the internal end portion of the axle 500 through a joint, and includes a first side link 621, a second side link 622, and a third side link 623 from the position adjacent to the axle 500.

The side link portion 620 may be configured to support the lateral movement of the axle 500, and to guide the width of the axle 500 when the axle 500 moves in the height direction.

The wheel 10 is fastened to one end portion of the axle 500 in the width direction, and the steering frame 200 is adjacently positioned inside the axle 500. The inside of the axle 500 and the internal surface of the steering frame 200 are fastened through the leaf spring unit 600.

Furthermore, the independent corner module includes the buffering portion 220 fastened to the axle 500 and fastened to an upper inside of the steering frame 200. The buffering portion 220 may be configured as a shock absorber, and may include a spring configured to surround the outside of the shock absorber. The buffering portion 220 may be positioned at a position corresponding to a bearing portion 230 to which the steering frame 200 and the up and down connection frame 320 are fastened.

The steering driving portion 100 includes a carrier link 110, a motor 120 positioned on an upper end portion of the carrier link 110, and a steering gear portion 130 positioned on a central axis of the motor 120. The steering gear portion 130 is configured so that a gear portion 210 formed on the one end portion of the steering frame 200 and a guide gear portion 310 positioned on the external surface of the vehicle body guide rail 300 are fastened to each other.

The carrier link 110 includes an upper plate 111 and a lower plate 113, and configured so that the steering gear portion 130 is positioned between the upper plate 111 and the lower plate 113. Moreover, at least a portion of an external one end portion of the vehicle body guide rail 300 and at least a portion of the one end portion of the steering frame 200 are positioned between the upper plate 111 and the lower plate 113. Therefore, if power is applied to the motor 120, the carrier link 110 of the steering driving portion 100 is configured to rotate and move along the external one end portion of the vehicle body guide rail 300 including the arc shape, and the steering frame 200 is configured to be rotated in the same direction along the steering gear portion 130. At least a portion of the gear portion 210 and the guide gear portion 310 is positioned between the upper plate 111 and the lower plate 113.

The upper end portion of the steering frame 200 includes the bearing portion 230 so that the steering frame 200 is fastened to be rotatable about the vehicle body. Therefore, if the driving force of the steering driving portion 100 is applied, the steering frame 200 may be configured to be rotated around the vehicle body guide rail 300 fixed to the vehicle body. The steering frame 200 is configured to be rotated around the up and down connection frame 320 of the vehicle body guide rail 300 to which the bearing portion 230 is fastened.

Furthermore, the steering frame 200 includes the gear portion 210 at the position corresponding to the steering gear portion 130 of the steering driving portion 100, and the gear portion 210 is configured to be coupled to the steering gear portion 130 to receive the driving force from the motor 120 of the steering driving portion 100. Therefore, the steering frame 200 is configured to be rotated by using, as the central axis, the steering frame 200 integrally with the axle 500.

The independent corner module includes an extension that extends one surface where the gear portion 210 of the steering frame 200 and the steering driving portion 100 face each other, and forms a kingpin axis that meets vertically the extension from a reference point where the up and down connection frame 320 of the vehicle body guide rail 300 and the steering frame 200 are fastened.

In FIG. 3A and FIG. 3B, as the exemplary embodiment of the present disclosure, the up and down connection frame of the vehicle body guide rail 300 has a shape that the height increases as it gets closer to the outside of the vehicle body, and the bearing portion 230 is positioned on one end portion of the up and down connection frame to be fastened so that the steering frame 200 has a predetermined angle with the up and down connection frame. Furthermore, the up and down connection frames may be fixed to the vehicle body, and the steering frame 200 may be configured to be rotated around the up and down connection frame around the bearing portion 230.

The up and down connection frame is configured to extend to the upper end portion of the steering frame 200 along the vehicle body guide rail 300 and configured to form the rotation center axis of the steering frame 200. Furthermore, the inclination of the up and down connection frame of the vehicle body guide rail 300 is configured to be substantially the same as an angle of the extension of the surface to which the gear portion 210 of the steering frame 200 and the steering gear portion 130 of the steering driving portion 100 are fastened.

Therefore, the kingpin axis shown in FIG. 3A and FIG. 3B is formed to correspond to the angles of the up and down connection frame of the vehicle body guide rail 300 and the extension.

Conversely, FIG. 4A and FIG. 4B show the relationship that the extension and the up and down connection frame are horizontal to the width direction of the vehicle.

In other words, the extension is substantially parallel to the horizontal direction of the vehicle, and furthermore, the up and down connection frame fastened to the steering frame 200 is configured as the state of being horizontal to the width direction of the vehicle body. The steering frame 200 fastened to the vehicle body guide rail 300 is configured as the state of being perpendicular to the extension and the state of being parallel to the height direction of the vehicle.

Therefore, according to the exemplary embodiment of FIG. 4A and FIG. 4B, the kingpin axis may be configured as the state of being substantially horizontal to the height direction of the vehicle body.

FIG. 5 shows the fastening relationship of the steering driving portion 100 as the exemplary embodiment of the present disclosure, and FIG. 6 shows the cross section of the fastening structure of the steering driving portion 100 including the carrier link 110, the steering frame 200, and the vehicle body guide rail 300 as the exemplary embodiment of the present disclosure.

As shown, the steering driving portion 100 includes the carrier link 110 configured to surround at least a portion of the steering frame 200 and the vehicle body guide rail 300. The carrier link 110 may include the upper plate 111 and the lower plate 113, and the upper plate 111 and the lower plate 113 may be positioned to be spaced from each other by the same distance. Furthermore, the steering driving portion 100 includes a fixing portion 115 configured to fix between the upper plate 111 and the lower plate 113. The fixing portion 115 is configured to maintain the distance between the upper plate 111 and the lower plate 113, and the steering gear portion 130 is configured to be fastened to the gear portion 210 of the steering frame 200 and the guide gear portion 310 of the vehicle body guide rail 300 in a space between the upper plate 111 and the lower plate 113 spaced from each other.

Furthermore, the steering driving portion 100 includes an upper roller portion 112 positioned on the upper plate 111 and formed at a position where the steering frame 200 and the vehicle body guide rail 300 face each other and a lower roller portion 114 positioned on the lower plate 113 and configured to face the steering frame 200 and the vehicle body guide rail 300.

Furthermore, the steering frame 200 and the vehicle body guide rail 300 that face the upper roller portion 112 and the lower roller portion 114 include inclined portions 400. Therefore, the upper roller portion 112 and the lower roller portion 114 are configured to be in surface-contact with the inclined portions 400.

Because the inclined portion 400 is formed based on one end portion fastened to the steering gear portion 130, the heights of the steering frame 200 and the vehicle body guide rail 300 facing the steering gear portion 130 in cross section are increased, and the heights of the steering frame 200 and the vehicle body guide rail 300 are decreased as they move away from the steering gear portion 130. Furthermore, the inclined portion 400 is be positioned inside the carrier link 110.

As shown in FIG. 6, the inclined portion 400 is formed on one end portion of the steering frame 200 and one end portion of the vehicle body guide rail 300 positioned inside the carrier link 110. Furthermore, the heights of the one end portions of the steering frame 200 and the vehicle body guide rail 300 positioned inside the carrier link 110 are formed to be greater than the heights of the steering frame 200 and the vehicle body guide rail 300 positioned outside the carrier link 110 and therefore, the inclined portions 400 are configured on upper and lower surfaces of the one end portion of the steering frame 200 and the one end portion of the vehicle body guide rail 300.

The upper roller portion 112 and the lower roller portion 114 are configured to be in surface-contact with the inclined portion 400, and the upper roller portion 112 and the lower roller portion 114 facing the inclined portion 400 of the vehicle body guide rail 300 are configured to be rotated so that the steering driving portion 100 is moved. Furthermore, the upper roller portion 112 and the lower roller portion 114 facing the inclined portion 400 formed on the one end portion of the steering frame 200 are configured to be rotated as the steering frame 200 is moved.

In other words, the upper roller portion 112 and the lower roller portion 114 are configured to maintain a low friction state in response to the relative movement between the steering frame 200 and the vehicle body guide rail 300 positioned inside the carrier link 110 and the steering driving portion 100.

Furthermore, the roller portions are configured to support a horizontal force and a vertical force applied from the steering frame 200 and the vehicle body guide rail 300 through the upper roller portion 112 and the lower roller portion 114 configured to face the steering frame 200 and the vehicle body guide rail 300 forming the inclined portion 400.

Furthermore, the upper roller portion 112 and the lower roller portion 114 positioned on the inclined portion 400 is configured as protrusions capable of maintaining a state where the steering frame 200 and the vehicle body guide rail 300 are latched to the inside of the carrier link 110.

FIG. 7A shows the independent corner module in a state where the steering angle is 0 degree as the exemplary embodiment of the present disclosure, FIG. 7B shows a state where the steering angle is 90 degrees to the left, and FIG. 7C shows a state where the steering angle is 90 degrees to the right.

As shown, in the state where the steering angle is 0 degree, the wheel 10 is positioned at a position corresponding to the longitudinal direction of the vehicle. Furthermore, the steering driving portion 100 is configured to be positioned on the gear portion 210 configured on the one end portion of the steering frame 200 facing the steering driving portion 100 in the arc shape and the center of the one end portion of the vehicle body guide rail 300 including the arc shape formed at the position corresponding to the gear portion 210 of the steering frame 200. The steering gear portion 130 is configured to be positioned in a central region of the gear portion 210 and in a central region of the guide gear portion 310, respectively.

As a case where the steering angle input is applied in the left direction in the state of FIG. 7A, if a steering angle input command according to the user's operation of the steering wheel or the autonomous driving is applied, the motor 120 of the steering driving portion 100 applies the driving force to be rotated clockwise.

According to the motor 120 to which the driving force is applied, the steering gear portion 130 is configured to be moved to the upper end portion of the guide gear portion 310 including the arc shape along the guide gear portion 310 of the vehicle body guide rail 300, and at the same time, the gear portion 210 of the steering frame 200 is configured to be moved to the upper end portion of the cross section along the steering gear portion 130. AAs the steering gear portion 130 is rotated, the steering driving portion 100 and the steering frame 200 are configured to be simultaneously rotated and moved.

As the exemplary embodiment of the present disclosure, as shown in FIG. 7B, the wheel 10 has an angle of 90 degrees to the left in a state where the steering gear portion 130 is maximally rotated, the steering gear portion 130 is configured to be positioned on an edge portion of the upper end portion of the guide gear portion 310, and an edge portion of the lower end portion of the gear portion 210 positioned on the steering frame 200 is moved to the position fastened to the steering gear portion 130.

Conversely, if the steering angle is applied to the right, the motor 120 of the steering driving portion 100 is configured to be rotated counterclockwise, and the steering gear portion 130 is moved to a position close to the lower end portion of the vehicle body guide rail 300. In addition, at the same time, the gear portion 210 of the steering frame 200 moves along the steering gear portion 130 and the edge portion of the upper end portion of the gear portion 210 is moved to the position fastened to the steering gear portion 130.

As a case where the steering angle is applied to the right, as shown in FIG. 7C, if the steering angle has 90 degrees to the right, the steering gear portion 130 is positioned on the edge portion of the lower end portion of the guide gear portion 310, and the upper end portion of the gear portion 210 of the steering frame 200 is moved to be fastened to the steering gear portion 130.

In summary, as the exemplary embodiment of the present disclosure, if the user's steering input or the steering input during autonomous driving is required, the driving force is applied to the motor 120 of the steering driving portion 100, and the steering driving portion 100 and the steering frame 200 are configured to be simultaneously rotated so that the steering angle requested by the user is applied to the wheel 10.

FIG. 8A shows a configuration view of the leaf spring unit 600 of the independent corner module as the exemplary embodiment of the present disclosure.

As shown, the leaf spring unit 600 is configured to be fastened to the internal one end portion of the axle 500 fastened to the wheel, and each of both end portions of the leaf spring unit 600 in the longitudinal direction and the inside of the leaf spring unit 600 is configured to be fixed to the steering frame 200.

According to an exemplary embodiment of the present disclosure, the leaf spring unit 600 includes the leaf spring portion 610 fixed to the axle 500 to have both end portions fixed to the lower surface of the steering frame 200 in the longitudinal direction and the side link portion 620 positioned by extending the leaf spring portion 610 from the region where the axle 500 is fastened in the width direction of the vehicle.

According to the exemplary embodiment of the present disclosure, one end portion of both end portions of the leaf spring portion 610 fastened to the steering frame 200 may be fastened through a shackle 700 to be having a relatively higher position than the other end portion thereof. Furthermore, the leaf spring portion 610 may be configured so that displacement in the longitudinal direction of the vehicle is applied by both end portions of the leaf spring portion 610 including different height positions. In other words, the one end portion of the leaf spring portion 610 fastened through the shackle 700 is configured to be fastened to the steering frame 200 so that the one end portion may be moved in the longitudinal direction as the leaf spring portion 610 is deployed in response to the vertical behavior of the wheel. Therefore, the leaf spring portion 610 is configured to be coupled to the steering frame 200 through the shackle 700 to extend or be contracted in the longitudinal direction with respect to the steering frame 200 by an elastic force of a plurality of plates forming the leaf spring portion 610.

As described above, the leaf spring portion 610 is configured to absorb the shock introduced through displacement in the height direction and the longitudinal direction in response to the shock applied to the wheel.

The side link portion 620 according to an exemplary embodiment of the present disclosure may form the coupling relationship between three links, and each of the links may be fastened to each other to have the degree of freedom in the vertical direction. Because an edge portion of each link may include a bearing coupling, each link is fastened to be rotatable in the vertical direction.

As the exemplary embodiment of the present disclosure, the side link portion 620 includes the first side link 621 extending in the side direction of the axle fastened to the leaf spring portion 610, the second side link 622 fastened to the edge portion of the first side link 621, and the third side link 623 positioned between the edge portion of the second side link 622 and the inside of the steering frame.

The side link portion 620 is configured to guide the movement in the width direction of the leaf spring portion 610 and the axle 500 in a bump or rebound section of the vehicle, and therefore, configured to guide the vertical movement and width directional movement of the vehicle of the leaf spring portion 610.

FIG. 8B shows the side link portion 620 viewed from the front as the exemplary embodiment of the present disclosure.

As shown, the leaf spring unit 600 includes the leaf spring portion 610 positioned on the lower end portion of the steering frame 200 in the longitudinal direction, and both end portions of the leaf spring portion 610 are positioned to be fastened to the lower surface of the steering frame 200. Furthermore, the one end portion of both end portions fastened to the steering frame 200 of the leaf spring portion 610 may be formed at a relatively higher position than the other end portion thereof.

At least one side link portion 620 may be configured, and is configured to support the width direction movement of the axle 500 and to interlock in response to the vertical movement of the steering frame 200.

According to the exemplary embodiment of the present disclosure, the side link portion 620 is configured to maintain the support relationship between the internal end portion of the axle 500 and the internal end portion of the steering frame 200 if the vertical displacement (bump and rebound) of the steering frame 200 occurs in response to the shock of the wheel.

FIG. 9 shows an equation for applying the steering angle to the wheel through the driving of the steering driving portion 100 as the exemplary embodiment of the present disclosure.

According to the shown equation, the steering angle is applied to the wheel 10 as follows.

$$\theta p/\theta o = (Rs+Ro)Rp$$

$$\theta s \times Rs = \theta p \times Rp = \theta o \times (Rs+Ro) \qquad \text{Equation 1}$$

($\theta p$=rotation angle of the steering driving portion 100, $\theta o$=rotation angle from the rotation center point of the steering frame to the center portion of the steering driving portion 100, Rs=distance from the rotation center point of the steering frame to the one end portion of the steering frame 200 in contact with the steering driving portion 100, Ro=distance from the rotation center point of the steering frame to the vehicle body guide rail 300 in contact with the steering driving portion 100, Rp=rotation radius of the steering driving portion 100)

The steering angle may be determined through the rotation angle of the steering driving portion 100, the distance from the rotation center point of the steering frame to the one end portion of the steering frame 200 positioned on the carrier link 110, and the distance from the rotation center point of the steering frame to the one end portion of the vehicle body guide rail 300 positioned on the carrier link 110, and determined through the rotation angle of the steering frame 200 moved simultaneously with the rotation of the steering driving portion 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An independent corner module comprising:
    an axle fastened to and positioned on a wheel;
    a steering frame fastened to the axle and rotated integrally with the axle to apply a steering angle to the wheel;
    a vehicle body guide rail positioned on a vehicle body and fastened to a rotation center axis of the steering frame; and
    a steering driving portion positioned between the steering frame and the vehicle body guide rail to apply a driving force,
    wherein the steering driving portion is moved along the vehicle body guide rail by the driving force of the steering driving portion, and the steering frame is rotated along the steering driving portion.

2. The independent corner module of claim 1, wherein the steering driving portion includes:
    a carrier link surrounding at least a portion of the steering frame and the vehicle body guide rail and moving along the vehicle body guide rail;
    an actuator configured to apply a rotation force; and
    a steering gear portion extending from a rotation axis of the actuator and fastened to the vehicle body guide rail and the steering frame.

3. The independent corner module of claim 2, wherein the actuator is a motor.

4. The independent corner module of claim 2, wherein the carrier link includes:
    an upper plate positioned on upper end portions of the steering frame and the vehicle body guide rail;
    a lower plate surrounding lower end portions of the steering frame and the vehicle body guide rail at a position corresponding to the upper plate;
    an upper roller portion positioned between the steering frame and the upper plate and between the vehicle body guide rail and the upper plate; and
    a lower roller portion positioned between the steering frame and the lower plate and between the vehicle body guide rail and the lower plate.

5. The independent corner module of claim 4, wherein the upper roller portion and the lower roller portion are aligned to face inclined portions formed on one end portions of the steering frame and the vehicle body guide rail.

6. The independent corner module of claim 1, wherein the steering frame includes:
    a buffering portion positioned between the steering frame and the axle; and
    a gear portion formed at a position facing and engaged to the steering driving portion.

7. The independent corner module of claim 1, wherein the vehicle body guide rail includes:
    a guide gear portion formed at a position facing and engaged to the steering driving portion;
    a bearing portion configured at a position facing an upper end portion of the steering frame; and
    an up and down connection frame fixing the bearing portion.

8. The independent corner module of claim 7, wherein the up and down connection frame is configured so that a height thereof is increased toward an outside surface of the vehicle body.

9. The independent corner module of claim 1, wherein respective surfaces of the steering frame and the vehicle body guide rail facing adjacent to each other have a same central arc shape.

10. The independent corner module of claim 1, further including a leaf spring unit positioned between the axle and the steering frame.

11. The independent corner module of claim 10, wherein the leaf spring unit includes:
    a leaf spring portion positioned on the axle and a lower end portion of the steering frame; and
    a side link portion positioned on the leaf spring portion and in a width direction of an internal surface of the steering frame.

12. The independent corner module of claim 11, wherein one end portion of first and second end portions of the leaf spring portion fastened to the steering frame is fastened through a shackle.

13. The independent corner module of claim 11, wherein the side link portion includes:
    a first side link extending in a side direction of the axle fastened to the leaf spring portion;
    a second side link fastened to an edge portion of the first side link; and
    a third side link positioned between an edge portion of the second side link and the inside of the steering frame.

14. The independent corner module of claim 1, wherein the steering driving portion is moved up to first and second end portions of the vehicle body guide rail in response to the driving force of the steering driving portion.

15. The independent corner module of claim 14, wherein the steering driving portion is positioned on first and second end portions of the steering frame when the steering driving portion is positioned on the first and second end portions of the vehicle body guide rail.

* * * * *